United States Patent
Retzbach

(10) Patent No.: US 12,440,904 B2
(45) Date of Patent: Oct. 14, 2025

(54) EXPANSION CLAMPING DEVICE AND METHOD OF MAKING SAME

(71) Applicant: Schunk GmbH & Co. KG Spann- und Greiftechnik, Lauffen am Neckar (DE)

(72) Inventor: Thomas Retzbach, Bönningheim (DE)

(73) Assignee: Klaus Raiser GmbH & Co. KG, Eberdingen (DE)

( * ) Notice: Subject to any disclaimer, the term of this patent is extended or adjusted under 35 U.S.C. 154(b) by 568 days.

(21) Appl. No.: 17/780,685

(22) PCT Filed: Nov. 27, 2020

(86) PCT No.: PCT/EP2020/083747
§ 371 (c)(1),
(2) Date: May 27, 2022

(87) PCT Pub. No.: WO2021/105436
PCT Pub. Date: Jun. 3, 2021

(65) Prior Publication Data
US 2023/0356304 A1    Nov. 9, 2023

(30) Foreign Application Priority Data

Nov. 28, 2019  (EP) ..................................... 19212256

(51) Int. Cl.
*B23B 31/30*       (2006.01)
*B23K 20/12*       (2006.01)
(Continued)

(52) U.S. Cl.
CPC ........ *B23B 31/305* (2013.01); *B23B 2240/16* (2013.01); *B23K 20/129* (2013.01);
(Continued)

(58) Field of Classification Search
CPC ............. B23B 31/1177; B23B 31/1178; B23B 31/305; B23B 2240/16
See application file for complete search history.

(56) References Cited

U.S. PATENT DOCUMENTS 1,818,042 A * 8/1931 Christman ............ B23B 31/305
                                                279/2.08
4,303,150 A * 12/1981 Olsson ................. B23B 31/305
                                                403/31
(Continued)

FOREIGN PATENT DOCUMENTS

DE     4012837 C1 *  7/1991
DE     19926152 A1   12/2000
(Continued)

OTHER PUBLICATIONS

European Search Report of Corresponding EP Application No. 19212256.2 dated Jun. 3, 2020.
(Continued)

*Primary Examiner* — Eric A. Gates
(74) *Attorney, Agent, or Firm* — CALDERON SAFRAN & WRIGHT P.C.

(57) ABSTRACT

The invention relates to an expansion clamping device having a main body (2) and an expansion sleeve (5) which is inserted into the main body (2) or surrounds the body, forming a pressure chamber (8), the pressure chamber (8) being capable of being acted upon by a hydraulic medium with resilient deformation of the expansion sleeve (5). The expansion sleeve (5) is integrally fixed to the main body (2) at the front axial end region (16) and/or at the rear axial end region (17) of the pressure chamber (8) via a friction-welded connection (14).

8 Claims, 12 Drawing Sheets

(51) Int. Cl.
   *B23K 20/227*  (2006.01)
   *B23K 101/20*  (2006.01)
   *B23K 103/04*  (2006.01)
   *B23P 15/00*   (2006.01)

(52) U.S. Cl.
   CPC ........ *B23K 20/227* (2013.01); *B23K 2101/20* (2018.08); *B23K 2103/04* (2018.08); *B23P 15/00* (2013.01)

(56) References Cited

U.S. PATENT DOCUMENTS

| | | | | |
|---|---|---|---|---|
| 5,127,780 | A * | 7/1992 | Massa | B23Q 3/086 |
| | | | | 279/2.01 |
| 5,197,720 | A * | 3/1993 | Renz | B23B 31/117 |
| | | | | 269/48.1 |
| 6,938,903 | B1 * | 9/2005 | Haimer | B23B 31/1179 |
| | | | | 279/4.06 |
| 7,217,072 | B1 | 5/2007 | Haimer | |
| 7,967,300 | B2 * | 6/2011 | Andre | B23B 31/305 |
| | | | | 279/4.06 |
| 8,579,562 | B2 * | 11/2013 | Haimer | B23B 31/1179 |
| | | | | 451/259 |
| 9,289,831 | B2 * | 3/2016 | Herud | B23B 31/305 |
| 9,676,037 | B2 * | 6/2017 | Herud | B23B 31/028 |
| 2013/0115023 | A1 * | 5/2013 | Haimer | B23B 31/107 |
| | | | | 407/30 |
| 2016/0193666 | A1 * | 7/2016 | Haimer | B23C 5/26 |
| | | | | 219/121.64 |

FOREIGN PATENT DOCUMENTS

| | | | | |
|---|---|---|---|---|
| DE | 102017002436 | A1 | 9/2018 | |
| EP | 0227620 | A2 * | 7/1987 | |
| EP | 0890402 | A1 * | 1/1999 | |
| EP | 2347842 | A2 | 7/2011 | |
| ES | 2296126 | T3 * | 4/2008 | ............ B23B 29/12 |
| ES | 2657909 | T3 * | 3/2018 | ............ B23B 31/083 |
| FR | 2495520 | A1 * | 6/1982 | |
| FR | 3059579 | A1 * | 6/2018 | ............ B23B 31/005 |
| JP | H02262904 | A | 10/1990 | |
| SE | 502498 | C2 * | 10/1995 | ............ B23B 31/305 |
| SE | 1551222 | A1 * | 3/2017 | |
| WO | 1993010928 | A1 | 6/1993 | |
| WO | 1998046896 | A1 | 10/1998 | |

OTHER PUBLICATIONS

International Search Report & Written Opinion of Corresponding PCT Application No. PCT/EP2020/083747 dated Mar. 22, 2021.
European Search Report of Corresponding EP Application No. 20823742.0 dated Jun. 17, 2025.

* cited by examiner

EXPANSION CLAMPING DEVICE AND METHOD OF MAKING SAME

CROSS-REFERENCE TO RELATED APPLICATIONS AND CLAIM TO PRIORITY

This application is a national stage application of International Application No. PCT/EP2020/083747 filed Nov. 27, 2020, which claims priority to European Patent Application No. 19212256.2 filed Nov. 28, 2019, the disclosures of which are incorporated herein by reference and to which priority is claimed.

FIELD OF THE INVENTION

The present invention relates to an expansion clamping device with a base body, which defines a longitudinal axis, and a sleeve, which is inserted into or surrounds the base body to form at least one pressure chamber, wherein the pressure chamber can be pressurized by a hydraulic medium in order to achieve a clamping effect. Furthermore, the invention relates to a method for manufacturing an expansion clamping device having a base body and a sleeve which is inserted into the base body to form a closed pressure chamber. Furthermore, the invention relates to a method of manufacturing an expansion clamping device having a base body and a sleeve which surrounds the base body to form a closed pressure chamber.

BACKGROUND OF THE INVENTION

Expansion devices of this type are known in various embodiments and are primarily used to fix a tool shaft, such as a drill or milling cutter shaft, in the work spindle of a corresponding machine tool. A distinction is made between two types of expansion clamping devices, namely on the one hand between the so-called expansion mandrel in which an elastically deformable sleeve surrounds the base body and expands radially outwards when pressure is applied to the pressure chamber, and on the other hand the expansion chuck, in which a sleeve is inserted into the base body and is deformed radially inwards to clamp a shaft or shaft.

EP 2 347 842 A2 describes an expansion device of the type mentioned above, in which the base body and an elastically deformable sleeve are fixed to each other by means of a brazed joint. A base body and/or a sleeve made of a low-alloy heat-treatable steel and a brazing material whose melting temperature is above the hardening temperature of the heat-treatable steel are provided. The brazed joint between the base body and the expansion sleeve is produced by a high-temperature brazing process in which the sleeve is positioned on the base body and the assembly is heated in a high-temperature furnace together with the required brazing material, which is accommodated in grooves provided for this purpose in the desired joint areas, in order to melt the brazing material and to join the sleeve and the base body together in a material-to-material bond.

The previously known prior art expansion device has proven itself in practice. Occasionally, however, the solder joints crack under compressive stress and the expansion device fails. Furthermore, there is a constant need to further simplify the manufacture of an expansion device and to enable its simple fabrication.

SUMMARY OF THE INVENTION

Based on this, it is a task of the present invention to provide an alternative expansion device which can be manufactured in a simple manner.

According to the invention, the task is solved by an expansion clamping device of the type mentioned above, in which the sleeve is fixed to the base body by a friction weld at the front axial end region of the pressure chamber and/or at the rear axial end region of the pressure chamber.

The invention is thus based on the idea of connecting the sleeve/expansion sleeve to the base body by means of a friction weld joint. One advantage of the friction weld joint is its strength, which can be higher than the strength of the materials of the base body and the expansion sleeve. Since no material has to be introduced into the gap between the base body and the expansion sleeve, a friction weld joint can be produced with relatively little effort. Furthermore, the joints between the base body and the expansion sleeve can be made much simpler with a friction weld joint than with a brazed joint. In addition, more material combinations can be joined together via a friction welded joint than with a brazed joint. Finally, the use of steel materials with high strength and hardness is possible when joining the base body and sleeve via a friction welded joint, as less heat is introduced into the base body and sleeve compared with a brazed joint and temperature-related damage to the materials is thus prevented.

Preferably, in its front and/or rear axial end region adjacent to a friction weld joint, the pressure chamber accommodates a welding bead produced during the creation of the friction weld joint and is widened here, in particular in the radial direction, relative to a central region of the pressure chamber in the axial direction.

When the base body and the sleeve are pressed axially against each other to create the friction weld joint and are heated by the friction generated during relative rotation of the base body and the sleeve, part of the heated, plastically deforming material of the base body and the sleeve is displaced radially. The fact that the pressure chamber is widened in the area adjacent to the friction weld joint allows a welding bead to form in this area.

According to a preferred embodiment, the sleeve is inserted into or surrounds the base body to form a single pressure chamber extending annularly around the longitudinal axis and is fixed to the base body at its front and/or rear end section by a friction weld joint. Thus, only one pressure chamber is provided, which extends almost over the entire length of the sleeve and is bounded and sealed at at least one of its end sections by the friction weld joint. At the other end section, the pressure chamber may be sealed by a sealing means, for example by an O-ring. Advantageously, the pressure chamber can be delimited at both of its end portions by a friction weld joint, whereby a particularly reliable sealing of the pressure chamber is achieved.

According to a further embodiment, it is provided that the sleeve is inserted into or surrounds the base body to form two axially successive pressure chambers. The two axially successive pressure chambers enable improved clamping of a workpiece and more precise axial alignment of the workpiece to be clamped.

Preferably, the sleeve is fixed axially between the pressure chambers to the base body by a friction weld joint. The two pressure chambers are thus sealed off from each other by a friction weld joint. The front end of the front pressure chamber and the rear end of the rear pressure chamber can be sealed by sealing means, for example by O-rings or brazed joints.

Furthermore, the sleeve can be fixed to the base body at the rear axial end region of the rear pressure chamber and/or at the front axial end region of the front pressure chamber by a friction weld joint. In this case, the sleeve can be materially fixed to the base body at both of its axial end sections by a friction weld joint, while the area between the two pressure chambers can be sealed by a sealing means, for example by an O-ring. In this way, the end sections of the expansion sleeve delimited by friction-welded joints are sealed in a particularly reliable manner.

In principle, it is also possible in an embodiment with two axially successive pressure chambers for the front pressure chamber, the rear pressure chamber to the rear and the two pressure chambers to be limited to each other by a friction weld joint in each case, so that the sleeve is fixed to the base body by a total of three axially successive friction weld joints.

Furthermore, the sleeve may also be inserted into or surround the main body forming more than two pressure chambers.

In a preferred manner, the or each friction weld joint is made by slip-on friction welding and/or the or each friction weld joint is made by a rotational welding process. As a result, the at least one connection between the base body and the sleeve can be produced in a particularly simple manner. Whereas two components are usually welded together on the end face by friction welding, sliding friction welding is understood to mean a friction welding process in which two components, one of which is cylindrical and the other hollow cylindrical, are joined together on a radially outer circumferential surface of the cylindrical component and a corresponding radially inner circumferential surface of the hollow cylindrical component. In this case, the mutually corresponding circumferential surfaces can be formed conically in order to be able to apply a frictional force.

Preferably, at least the sleeve is heat-treated, in particular case-hardened and/or tempered and/or nitrided. This allows the surface of the sleeve, in particular its inner surface, to be hardened. Particularly preferably, provision can be made for the base body and the sleeve connected thereto to be nitrided and, in particular, gas-nitrided, the nitriding process taking place after fixing via the friction-welded connection. In a preferred manner, the nitriding process takes place at a temperature of 500 to 600° C., in particular at 550° C. for a duration of 6 to 10 hours, in particular 7 to 9 hours. During this process, the basic structure is tempered and a high surface hardness of 650-750 HV1 (Vickers hardness) is achieved with appropriate corrosion protection.

According to a preferred embodiment, the sleeve has or consists of a non-alloy steel and/or a low-alloy steel and/or a high-alloy steel and/or a case-hardened steel, in particular a 20MnCrS5 case-hardened steel, and/or a ceramic material. A 20MnCrS5 case-hardened steel is inexpensive and can be machined with little effort. As a result, the wear of the machining tools used to machine the expansion sleeve is manageable.

According to one embodiment of the invention, the sleeve is designed as an expansion sleeve which is elastically deformed when the pressure chamber is pressurized in order to achieve a clamping effect. In this case, the elastic sleeve may be inserted into the base body, in which case the inner surface of the sleeve forms a clamping surface. In this case, the expansion clamping device is designed as an expansion chuck, the clamping surface of which can receive and frictionally fix a tool. The surface coating protects the clamping surface against corrosion and/or wear so that it has an extended service life.

Alternatively, the sleeve can surround the base body, with the outer surface of the sleeve forming a clamping surface. In this case, the expansion clamping device is designed as an expansion mandrel via which a component, in particular a tool, can be clamped radially from the inside.

In a further embodiment of the present invention, an axially front end of the base body is designed as an expansion sleeve and the sleeve is pushed axially onto the expansion sleeve, at least one pressure chamber being formed between the sleeve and the expansion sleeve, the inner surface of the expansion sleeve forming a clamping surface and the expansion sleeve being elastically deformed when the pressure chamber is acted upon by a hydraulic medium in order to achieve a clamping effect. Here, too, the expansion clamping device is designed as an expansion chuck, with the expansion sleeve being an integral part of the base body.

Preferably, the clamping surface is provided with a surface coating, which can be applied in particular by oxidation or manganese phosphating. This can improve the corrosion resistance and wear resistance of the clamping surface. Preferably, to increase the corrosion resistance, the clamping surface can be blued or oxidized, resulting in a quasi black-blue surface. The expansion chuck produced in this way can then be finish machined, in which case it loses its hardness due to material removal, which according to tests carried out is around 550-650 HV1. Alternatively, the clamping surface can be coated by manganese phosphating. This is a purely chemical process.

Expediently, the expansion clamping device can have clamping means which are designed to selectively cause an increase in pressure in the hydraulic medium, the clamping means being operatively connected to the pressure chamber via a hydraulic medium supply channel. The hydraulic medium in the pressure chamber can thus be pressurized in a simple manner so that the expansion sleeve deforms radially inwards or outwards and a tool shaft can thus be non-positively fixed without great effort.

Furthermore, it is an object of the invention to disclose a method for manufacturing an expansion clamping device.

This task is solved by a method of manufacturing expansion clamping device in the form of an expansion chuck comprising a base body defining a longitudinal axis and a sleeve in the form of an elastic expansion sleeve which is inserted into the base body to form at least one closed pressure chamber and defines a central receptacle of cylindrical basic shape with a clamping surface into which a component to be clamped can be inserted from the front side of the expansion chuck, comprising the following steps:

a) Provision of a base body which has a central axial bore open towards the front end face of the base body, and of an expansion sleeve workpiece which has an expansion sleeve shaft of cylindrical basic shape which can be inserted into the central axial bore of the base body, wherein recesses for forming the at least one pressure chamber are formed in the outer surface of the expansion sleeve shaft and/or in the inner surface of the base body defining the central axial bore, b) Inserting the expansion sleeve shaft into the central axial bore of the base body, c) Axially pressing the base body and the expansion sleeve workpiece against each other while the base body and/or the expansion sleeve workpiece perform movements about the longitudinal axis, in particular rotate about the longitudinal axis, in order to generate a relative movement between the base body and the expansion sleeve workpiece, wherein mutually corresponding stop faces of the base body and of the expansion sleeve workpiece are pressed axially against one another at the front axial end region of the at least one pressure chamber and/or at the rear axial end region of the at least one pressure chamber and are heated by the friction, so that the expansion sleeve workpiece is fixed to the base body in the region of the stop faces by means of a friction weld joint, d) Termination of the relative movement so that the base body and the expansion sleeve workpiece cool down.

In the process, the base body and the expansion sleeve workpiece are first axially aligned with each other, for which purpose the base body and the expansion sleeve workpiece can be firmly clamped in a friction welding machine. The expansion sleeve workpiece is now pushed into the base body by an axial feed movement until the base body and the expansion sleeve workpiece are brought into contact at at least two mutually correlating, in particular circumferential, stop surfaces. During or after insertion, the base body and the sleeve are rotated relative to each other.

While the base body and the expansion sleeve workpiece are set in relative rotation to each other, the expansion sleeve workpiece and the base body are pressed against each other, in particular by an axial force, at the correlating stop surfaces. The sliding friction generated in this way heats the materials of the base body and the expansion sleeve workpiece at the stop surfaces, and heat is introduced into the base body and the expansion sleeve workpiece. To fix the expansion sleeve workpiece to the base body with a material bond, the relative rotation of the base body and the expansion sleeve workpiece is slowed down, with the expansion sleeve workpiece and the base body optionally being pressed further against each other so that the base body and/or the expansion sleeve workpiece are upset to form a welding bead and a material bond is produced.

The fact that the expansion sleeve workpiece and the base body are clamped in the friction welding machine during the entire friction welding process ensures precise axial alignment of the expansion sleeve with the base body. Residues of cooling lubricants or anti-corrosion oils generally have no influence on the quality of a friction weld joint, so that the expansion sleeve workpiece and the base body do not have to be subjected to any cleaning process before they are turned into an expansion fixture by the specified process.

This process allows the sleeve to be fixed to the base body by friction welding with little effort and the resulting pressure chamber to be reliably sealed. The welding process can be fully automated and integrated into a production line. The friction weld joint has a high strength which, due to its simple design, is subject to less variation than other forms of connection known from the prior art, for example a brazed joint.

Preferably, the expansion sleeve workpiece can be pressed further into the base body after the relative movement has ended. In this way, a durable friction weld joint can be achieved, the welding bead of which can be completely accommodated in the adjacent axial end region of the pressure chamber.

According to a preferred embodiment, in steps a) to d) the expansion sleeve shaft can be inserted into the base body to form a single pressure chamber extending annularly around the longitudinal axis, and the expansion sleeve shaft can be fixed to the base body at its front and/or rear end section by a friction weld joint. In this process, an expansion sleeve is produced with only one annular circumferential pressure chamber, which is bounded and sealed at at least one of its end sections by the friction weld joint. At the other end section, the pressure chamber can be sealed by a sealing means, for example by an O-ring. In a preferred manner, the pressure chamber can be bounded and sealed at its two end portions by a friction weld joint in each case, whereby a particularly reliable sealing of the pressure chamber can be achieved.

According to a further preferred embodiment, in steps a) to d) the expansion sleeve shaft can be inserted into the base body to form two pressure chambers located axially one behind the other and extending annularly around the longitudinal axis, and fixed to the base body by means of a friction weld joint. In this way, an expansion chuck can be produced which, due to the two pressure chambers lying axially one behind the other, enables improved clamping and more precise axial alignment of the workpiece to be clamped.

Preferably, it can be provided that in step c) the respective mutually corresponding stop faces of the base body and of the expansion sleeve workpiece are formed at the front axial end region of the front pressure chamber and/or at the rear axial end region of the rear pressure chamber. Particularly preferably, the respective mutually corresponding stop faces can be formed at the front axial end region of the front pressure chamber and at the rear axial end region of the rear pressure chamber, so that the expansion sleeve workpiece can be fixed to the base body at these with a material bond. Since the axial end region of the pressure chamber adjacent to it or the axial end regions of the pressure chambers adjacent to it are both delimited and sealed via a friction weld joint, this adjacent end region or these adjacent end regions are sealed particularly reliably. The area between the two pressure chambers can be sealed by a sealing means, for example by an O-ring.

Alternatively, it can be provided that in step c) only two corresponding stop faces of the base body and the expansion sleeve workpiece are formed axially between the two pressure chambers and the expansion sleeve tool is fixed to the base body with a material bond at these.

Expediently, the or each friction weld joint can be made by slip-on friction welding, so that thereby the at least one friction weld joint between the base body and the expansion sleeve can be made in a particularly simple manner.

Advantageously, after steps a) to d), a section of the expansion sleeve workpiece protruding from the front end face of the base body is cut off (step e)). Thus, after the superfluous section of the expansion sleeve workpiece has been cut off, only one expansion sleeve remains, which is inserted into the base body to form a closed pressure chamber.

According to a preferred embodiment, it can be provided that a solid expansion sleeve shaft is provided and a receptacle is produced in this shaft after step e). Thus, a provided expansion sleeve shaft consisting of solid material can be provided with a receptacle, in particular a receptacle with a circular cylindrical cross-section. By cutting off the superfluous section of the expansion sleeve workpiece beforehand, the depth of the receptacle to be manufactured is limited only to the length of the pressure chamber. The use of a solid expansion sleeve shaft ensures good force transmission even of high axial forces during steps b) to d).

Alternatively, the expansion sleeve shaft provided can be of hollow design, the expansion sleeve shaft being supported on the inside during steps b) to d) and/or the holder being produced on the expansion sleeve manufactured from the expansion sleeve shaft after step e). The hollow expansion sleeve shaft can be supported during process steps b) to d) to protect it from deformation as a result of the forces applied during friction welding or other damage. Optionally, following step e), a receptacle can be produced and/or expanded in the hollow expansion sleeve shaft.

In a preferred manner, the expansion sleeve workpiece with existing mountings can be heat treated, in particular case-hardened and/or quenched and tempered and/or nitrided. This can improve its surface hardness and corrosion resistance.

Advantageously, the expansion sleeve shaft can comprise or consist of a non-alloy steel and/or a low-alloy steel and/or a high-alloy steel and/or a case-hardened steel, in particular 20MnCrS5 case-hardened steel, and/or a ceramic material. A 20MnCrS5 case-hardened steel is relatively inexpensive and can be machined with little effort and manageable wear on the cutting tools used for this purpose.

Preferably, the clamping surface can be provided with a surface coating, in particular the surface coating can be applied by oxidizing or by manganese phosphating. This can improve the corrosion resistance and wear resistance of the clamping surface and its friction values.

Finally, the task according to the invention is solved by a method for manufacturing an expansion clamping device designed as an expansion mandrel with a base body defining a longitudinal axis and an expansion sleeve which surrounds the base body forming at least one closed pressure chamber and defines on its outer surface a clamping surface onto which a component to be clamped can be pushed from the front side of the expansion device, comprising the following steps:
  aa) Provision of a base body, which has a cylindrical base body shaft on its front end face, and of a hollow expansion sleeve workpiece, which can be pushed onto the base body shaft, depressions for forming the at least one pressure chamber being formed in the outer surface of the base body shaft and/or in the inner surface of the expansion sleeve workpiece,
  bb) Sliding the expansion sleeve workpiece onto the base body,
  cc) Axially pressing the base body and the expansion sleeve workpiece against each other while the base body and/or the expansion sleeve workpiece perform movements about the longitudinal axis, in particular rotate about the longitudinal axis, in order to generate a relative movement between the base body and the expansion sleeve workpiece, wherein mutually corresponding stop faces of the base body and of the expansion sleeve workpiece are pressed axially against one another at the front axial end region of the at least one pressure chamber and/or at the rear axial end region of the at least one pressure chamber and are heated by the friction, so that the expansion sleeve workpiece is fixed to the base body in the region of the stop faces by means of a friction weld,
  dd) Termination of the relative movement so that the base body and the expansion sleeve workpiece cool down.

In the process, the base body and the expansion sleeve workpiece are first axially aligned with each other, for which purpose the base body and the expansion sleeve workpiece can be firmly clamped in a friction welding machine. Now the expansion sleeve workpiece is pushed onto the base body by an axial feed movement. In particular, the expansion sleeve workpiece can be pushed onto the base body until the base body and the expansion sleeve workpiece are brought into contact at at least two mutually correlating, in particular circumferential, stop surfaces. During or after sliding on, the base body and the expansion sleeve workpiece are rotated relative to each other.

While the base body and the expansion sleeve workpiece are set in relative rotation to each other, the expansion sleeve workpiece and the base body are pressed against each other, in particular by an axial force, at the correlating stop surfaces. As a result of the friction generated, the materials of the base body and the expansion sleeve workpiece are heated at the stop surfaces and heat is introduced into the base body and the expansion sleeve workpiece. To fix the expansion sleeve workpiece to the base body with a material bond, the relative rotation of the base body and the expansion sleeve workpiece is braked, with the expansion sleeve workpiece and the base body optionally being pressed against each other so that the base body and/or the expansion sleeve workpiece are upset to form a welding bead and a material bond is produced.

The fact that the expansion sleeve workpiece and the base body are clamped during the entire friction welding process ensures precise axial alignment of the expansion sleeve with the base body. Residues of cooling lubricants or anti-corrosion oils generally have no influence on the quality of a friction weld joint, so that the expansion sleeve workpiece and the base body do not have to be subjected to any cleaning process before they are turned into an expansion fixture by the specified process.

This process allows the sleeve to be fixed to the base body by friction welding with little effort and the resulting pressure chamber to be reliably sealed. The welding process can be fully automated and integrated into a production line. The friction weld joint has a high strength which, due to its simple design, is subject to less variation than other prior art joint forms, for example a brazed joint.

Preferably, the expansion sleeve workpiece is pressed further onto the base body after the relative movement has ended. In this way, a durable friction weld joint can be achieved, the weld bead of which can be completely accommodated in the adjacent axial end region of the pressure chamber.

According to a preferred embodiment, the expansion sleeve workpiece is fixed in steps aa) to dd) at its front and/or rear end section to the base body shaft by means of a friction weld joint, so that the expansion sleeve workpiece surrounds the base body shaft to form a single pressure chamber extending annularly around the longitudinal axis. In this process, a mandrel is produced with only one annular circumferential pressure chamber, which extends over almost the entire length of the expansion sleeve, and is bounded at at least one of its end sections by a friction weld joint. At the other end portion, the pressure chamber may be sealed by a sealing means, such as an O-ring. In a preferred manner, the pressure chamber can be bounded and sealed at its two end portions by a friction weld joint in each case, thus providing a particularly reliable seal for the pressure chamber.

Alternatively, in steps aa) to dd), the expansion sleeve workpiece is fixed to the base body by means of a friction weld joint, the expansion sleeve workpiece surrounding the base body to form two pressure chambers located axially one behind the other and extending annularly around the longitudinal axis. This makes it possible to produce an expansion mandrel with two pressure chambers located axially one behind the other, which enables improved gripping and more precise axial alignment of the workpiece to be clamped.

In a preferred manner, the expansion sleeve workpiece is fixed axially between the pressure chambers to the base body shaft with a material bond. Further preferably, in step cc) the respective mutually corresponding stop faces of the base body and of the expansion sleeve workpiece can be formed on the front axial end region of the front pressure chamber and/or on the rear axial end region of the rear pressure chamber. Particularly preferably, the respective mutually corresponding stop surfaces can be formed at the front axial end region of the front pressure chamber and at the rear axial end region of the rear pressure chamber, so that the expansion sleeve workpiece is fixed to the base body in a materially bonded manner at these. Via the friction weld joints, the front end region of the front pressure chamber and the rear end region of the rear pressure chamber can be delimited and sealed in a particularly reliable manner. The area between the two pressure chambers can be sealed by a sealing agent, for example an O-ring.

Alternatively, it can be provided that in step cc) only two corresponding stop faces of the base body and the expansion sleeve workpiece are formed in the area between the two pressure chambers and the base body and the expansion sleeve tool are fixed to them by material bonding. The expansion sleeve workpiece is fixed to the base body by a single friction weld joint located axially between the pressure chambers. The area between the two pressure chambers is sealed in a particularly reliable manner by the friction weld joint, while the front end of the front pressure chamber and the rear end of the rear pressure chamber can be sealed by sealing means, for example by O-rings.

Expediently, the or each friction weld joint can be produced by slip-on friction welding. In this way, the at least one connection between the base body and the expansion sleeve can be produced in a particularly simple manner.

Preferably, after steps aa) to dd), a section of the expansion sleeve workpiece projecting beyond the front end face of the base body is cut off (step ee)). Thus, after the superfluous section of the expansion sleeve workpiece has been cut off, only a sleeve remains which surrounds the base body to form a closed pressure chamber.

Advantageously, after step ee) at least part of the outer surface of the expansion sleeve fixed to the base body is machined, in particular by removing a welding bead produced when making the friction weld joint and/or by producing a clamping surface. By previously cutting off the superfluous section of the expansion sleeve workpiece in step ee), only the lateral surface of the expansion sleeve, but not that of the entire expansion sleeve workpiece, is machined. This makes it easier to produce the clamping surface.

According to a preferred embodiment, the expansion sleeve workpiece with existing clamping surface can be heat treated, in particular case-hardened and/or tempered and/or nitrided. This can improve its surface hardness and corrosion resistance and in particular the surface hardness and corrosion resistance of the clamping surface.

Preferably, the expansion sleeve workpiece can comprise or consist of a non-alloy steel and/or a low-alloy steel and/or a high-alloy steel and/or a ceramic material and/or a case-hardened steel, in particular a 20MnCrS5 case-hardened steel. This is inexpensive and can be machined with little effort and manageable wear of cutting tools used for this purpose. This means, for example, that the section of the expansion sleeve workpiece projecting beyond the front end face of the base body can be cut off and the clamping surface produced with little effort and manageable wear of the cutting tools.

More expediently, the clamping surface can be provided with a surface coating. In a particularly preferred manner, the surface coating can be applied by oxidizing or by manganese phosphating. This can improve the corrosion resistance and wear resistance of the clamping surface and improve its friction values.

BRIEF DESCRIPTION OF THE DRAWINGS

With respect to further embodiments of the present invention, reference is made to the following embodiments with reference to the accompanying drawings. In the drawings show.

DETAILED DESCRIPTION OF THE PREFERRED EMBODIMENT(S)

Figure 1:
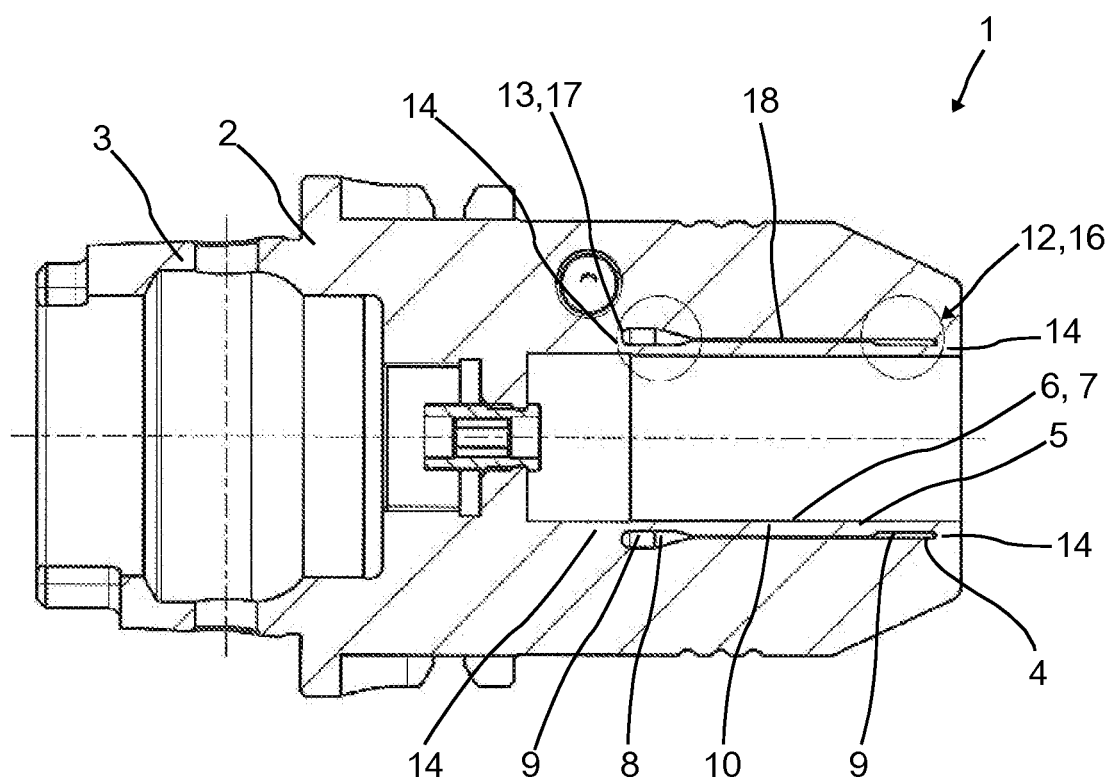
FIG. 1 a longitudinal sectional view of an expansion clamping device according to one embodiment of the present invention.

FIG. 1 shows an embodiment of an expansion chuck 1 according to the present invention. The expansion chuck 1 is designed as a hollow taper shaft toolholder (HSK) and comprises a base body 2 made of a 20MnCrS5 case-hardened steel, which has a fastening cone 3 at its left-hand end region in a manner known per se for clamping to a rotationally driven work spindle of a machine tool. An axial bore 4 is provided at the opposite front end region of the base body 2, into which a sleeve 5 is inserted. The sleeve 5 forms a receptacle 6 into which a cylindrical shaft of a tool such as a drill or milling cutter can be inserted, the inner surface of the expansion sleeve 5 forming a clamping surface 7.

A pressure chamber 8 is formed between the sleeve 5 and the base body 2, which surrounds the receptacle 6 and is aligned coaxially with it. The pressure chamber 8, whose axial length corresponds approximately to the length of the clamping surface 7, is formed by ring-like recesses 9 in the outer surface of the sleeve 5 and in the inner surface of the axial bore 4 of the base body 2.

Figure 4:
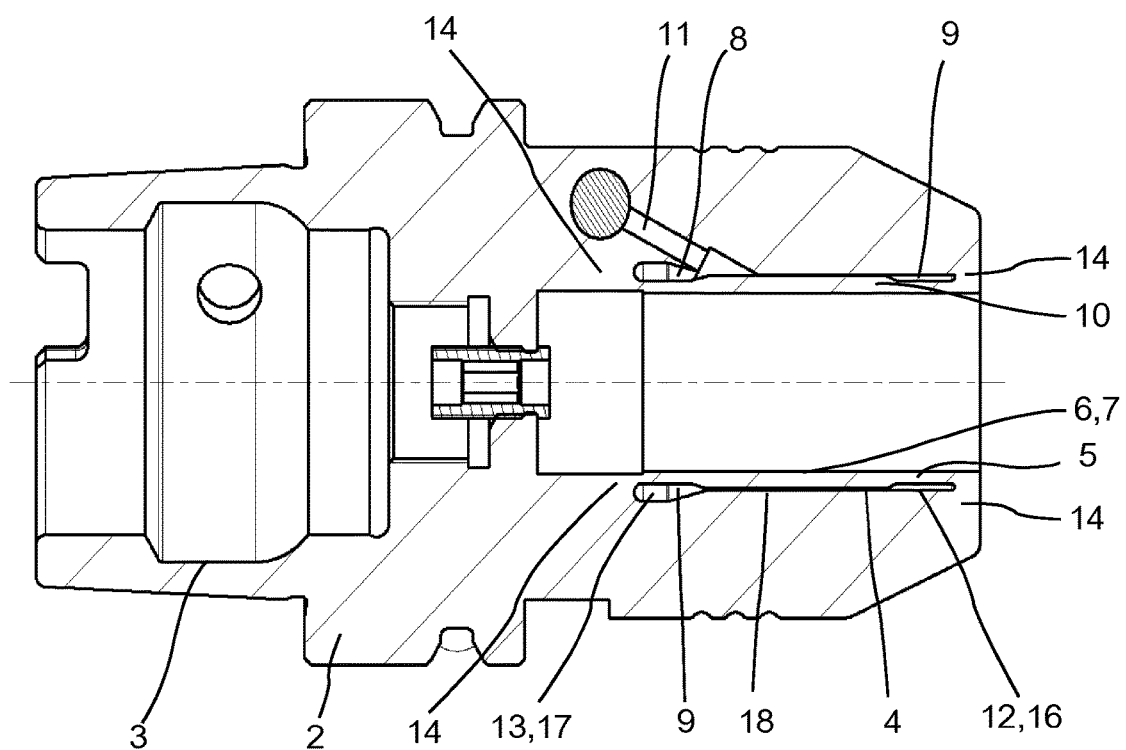
FIG. 4 a further longitudinal sectional view of the expansion device of FIG. 1.

Towards the receptacle 6, the pressure chamber 8 is bounded by a relatively narrow inner wall 10 of the sleeve 5 and radially outwards by the wall of the base body 2, the wall thickness of which is several times greater than the wall thickness of the inner wall 10. The pressure chamber 8 is filled with a hydraulic medium such as oil and is operatively connected to a clamping means via a hydraulic medium supply channel 11, so that an increase in pressure in the hydraulic medium can be selectively effected via the clamping means. As can be seen in FIG. 4, the pressure chamber 8 is in communication with a hydraulic medium source via a hydraulic medium supply channel 11 formed in the base body 2, through which it can be pressurized for clamping a tool. The pressure medium source can be formed in a manner known per se by a cylinder chamber formed in the base body 2, which is closed at the end by a piston-like actuator which can be screwed into the cylinder chamber to increase the pressure, or screwed out of it to reduce the pressure. The hydraulic pressure is transmitted to the pressure chamber 8 via the hydraulic fluid supply channel 11 and causes the inner wall 10 to bulge elastically radially inward until it force-fittedly encloses a tool shaft inserted in the holder 6.

Figure 2:
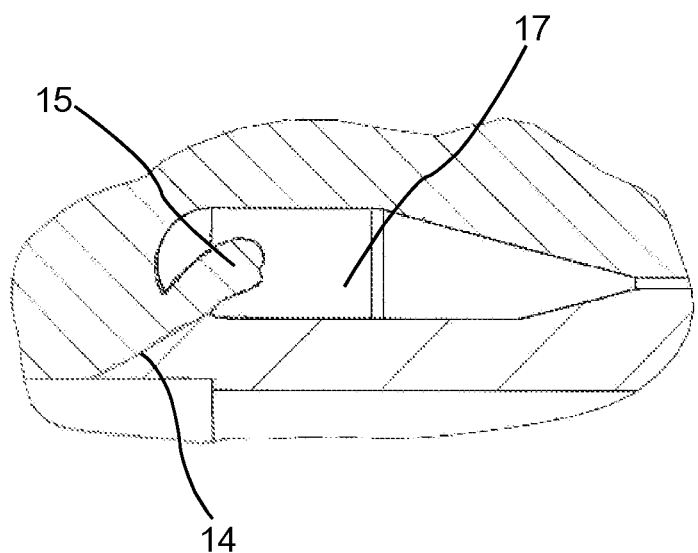
FIG. 2 a longitudinal sectional view of an axial end region of the pressure chamber formed between the main body and the sleeve of FIG. 1.
Figure 3:
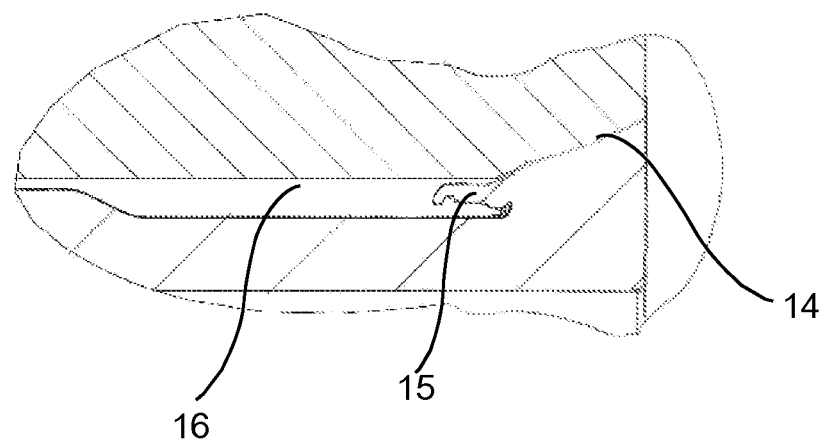
FIG. 3 a longitudinal sectional view of the other axial end portion of the pressure chamber of FIG. 1.

In FIGS. 2 and 3, it can be seen that the sleeve 5 is fixed to the base body 2 at its front axial end section 12 and at its rear axial end section 13 by means of a friction weld joint 14 in each case. In order to accommodate the welding bead 15 produced during the creation of the respective friction weld joint 14, the pressure chamber 8 is widened in its front axial end region 16 and in its rear axial end region 17 in the radial direction relative to a central region 18 of the pressure chamber 8 in the axial direction.

Figure 5:
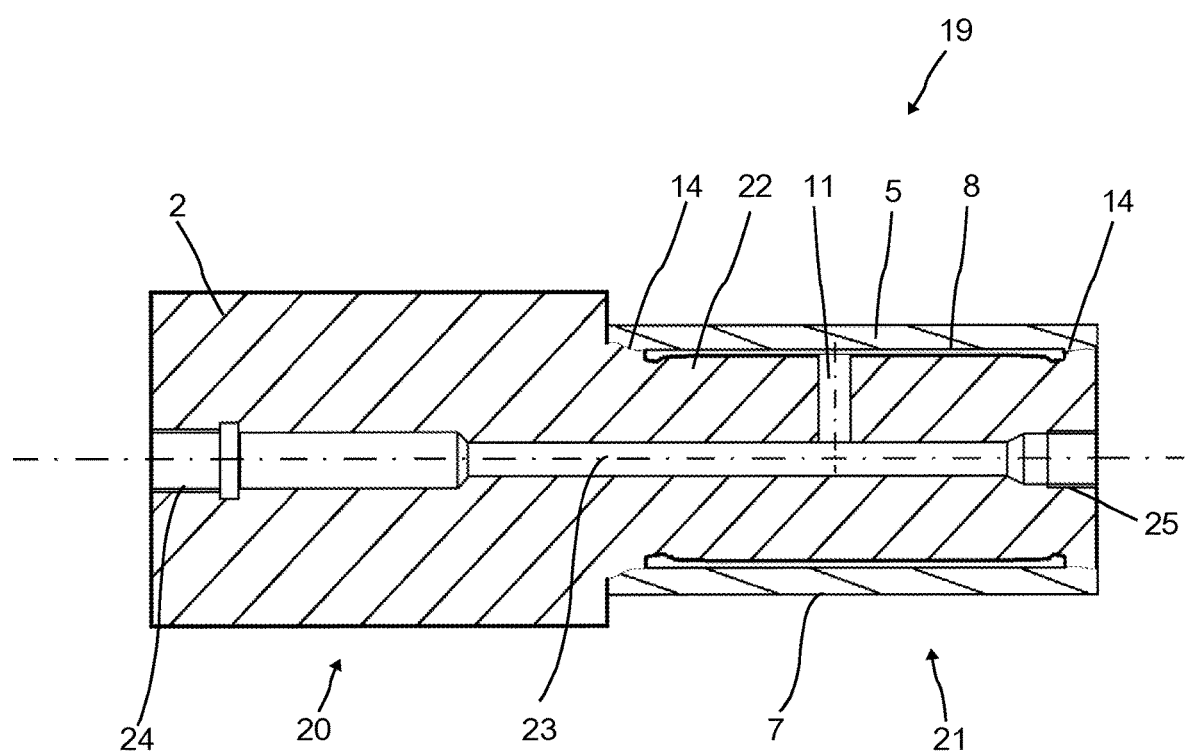
FIG. 5 a longitudinal sectional view of a second embodiment of an expansion clamping device according to the present invention.

FIG. 5 shows an expansion device in the form of an expansion mandrel 19 in accordance with the present invention. The expansion mandrel 19 is intended to clamp a component from the inside and has a base body 2 which can be clamped in a work spindle of a working machine at its end region 20 shown on the left. At its end region 21 shown on the right, the base body 2 has a base body shaft 22, which carries a sleeve 5 radially on the outside, which is fixed to it by two friction welded connections 14.

The base body 2 and the sleeve 5 are shown with different hatching in FIG. 5. In contrast to the expansion chuck 1 shown in FIGS. 1 to 4, the expansion sleeve 5 surrounds the base body 2 to form a pressure chamber 8, and the outer surface of the sleeve 5 forms a clamping surface 7 onto which a component to be clamped can be pushed.

The pressure chamber 8 is in communication with a hydraulic medium channel 23, which is formed centrally in the base body 2 and passes axially through the base body 2, via a hydraulic medium supply channel 11. The hydraulic medium channel 23 is provided at its end regions with threaded holes 24, 25, which are closed by clamping screws not shown. In order to clamp a component, one of these clamping screws is screwed into the interior of the base body, which increases the hydraulic pressure within the hydraulic medium channel 23, the hydraulic medium supply channel 11 and the pressure chamber 8, and in this way the sleeve 5 is elastically deformed outwards in order to force-fit a pushed-on component.

Figure 6:
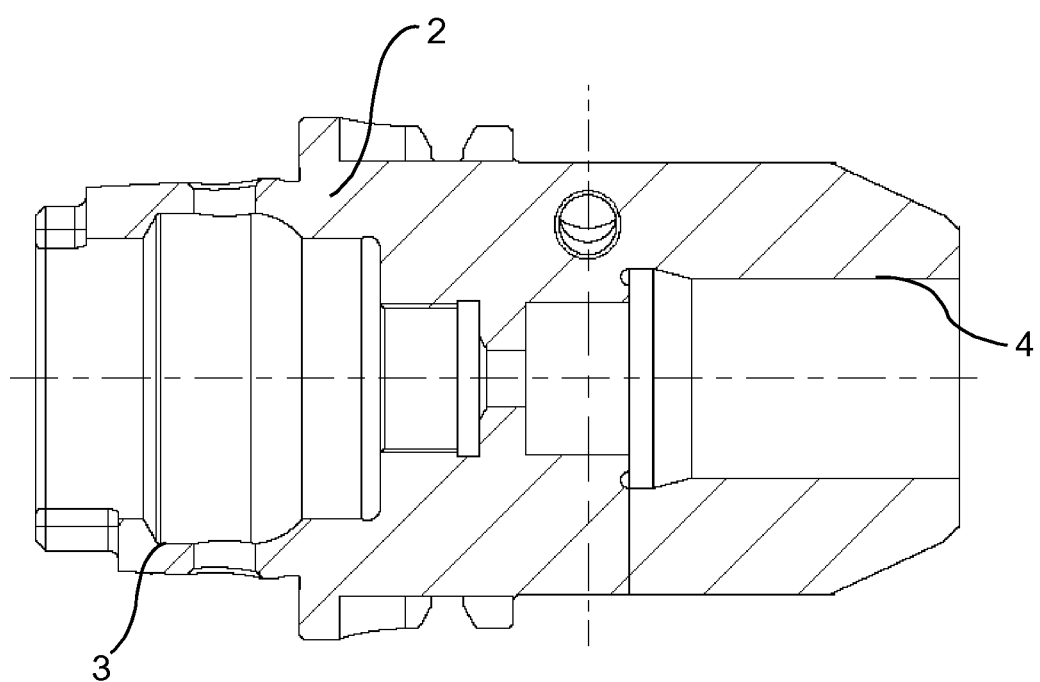
FIG. 6 a longitudinal sectional view of a basic body for producing the expansion clamping device of FIG. 1.
Figure 7:
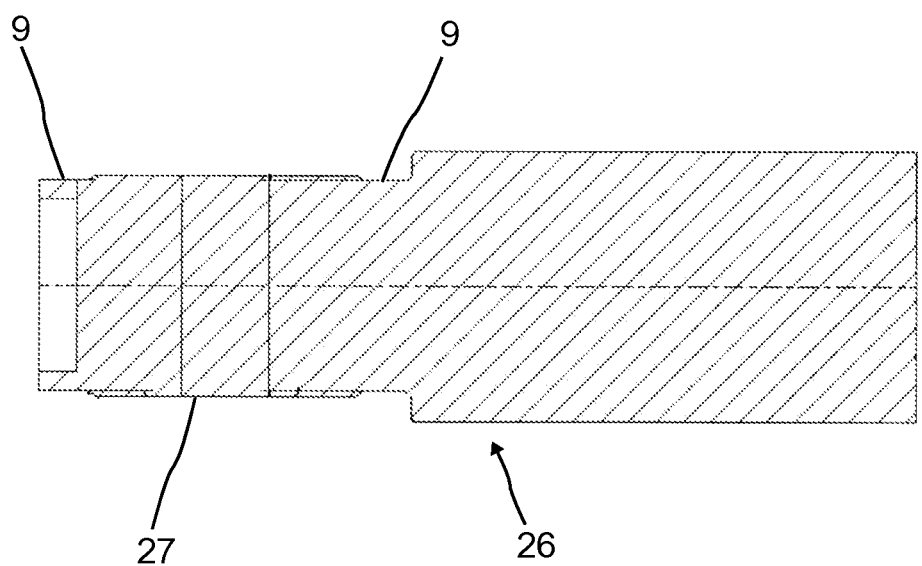
FIG. 7 a longitudinal sectional view of an expansion sleeve workpiece for producing the expansion device of FIG. 1.
Figure 8:
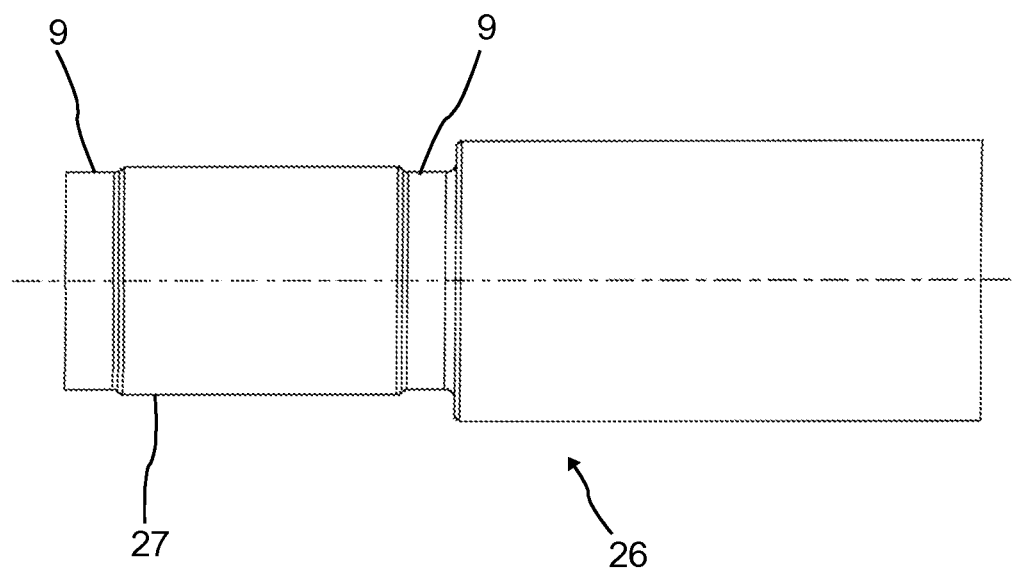
FIG. 8 a side view of the expansion sleeve workpiece of FIG. 7.

FIGS. 6 to 9 illustrate a method of manufacturing the expansion chuck device designed as expansion chuck 1, as shown in FIGS. 1 to 4. In this process, the base body 2, as shown in FIG. 6, and an expansion sleeve workpiece 26, as shown in FIGS. 7 and 8, are provided. The base body 2 has a central axial bore 4 open towards its front end face. The expansion sleeve workpiece 27 has a basic cylindrical shape and is solidly made of solid material. Furthermore, the expansion sleeve workpiece 27 is provided with an expansion sleeve shaft 27 which can be inserted into the axial bore 4 of the base body 2, wherein depressions in the form of ring-like recesses 9 for forming the pressure chamber 8 are formed in the outer circumferential surface of the expansion sleeve shaft 27 and/or the inner surface of the base body 2 defining the central axial bore 4.

Figure 9:
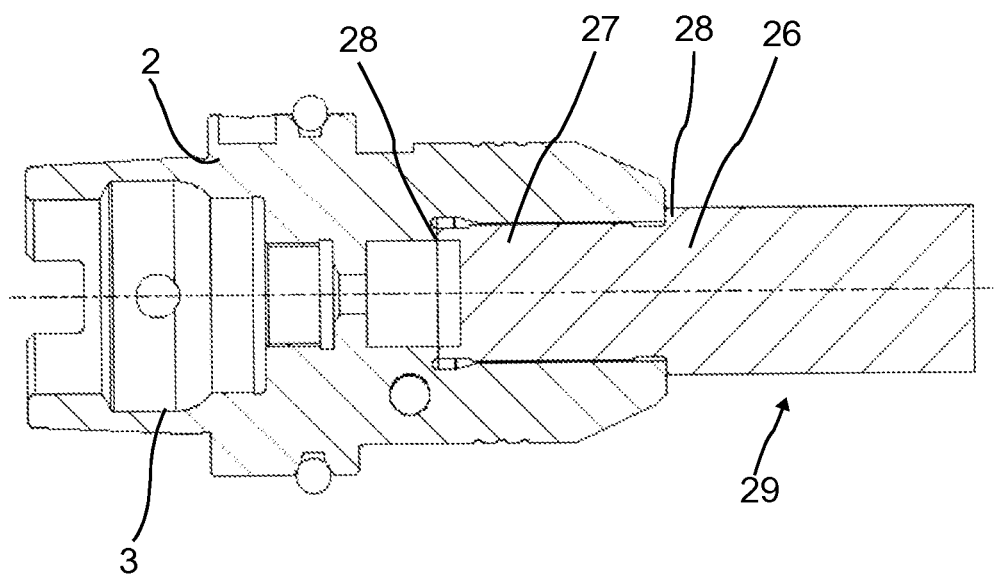
FIG. 9 a longitudinal sectional view of the base body of FIG. 6 and of the expansion sleeve workpiece of FIG. 7 inserted into an axial bore of the base body FIG. 10 a longitudinal sectional view of an expansion chuck according to another embodiment of the present invention.

FIG. 9 shows the base body 2 with the inserted expansion sleeve shaft 27 of an expansion sleeve workpiece 26. In the process for manufacturing an expansion device designed as an expansion chuck 1, the expansion sleeve shaft 27 is inserted into the base body 2 until contact is made between two respective pairs of mutually correlating stop surfaces 28 of the base body 2 and the expansion sleeve workpiece 26 at the front and rear axial end regions 16, 17 of the pressure chamber 8.

Subsequently, the base body 2 and the expansion sleeve workpiece 26 are pressed against each other at the two respective pairs of correlating stop faces 28 while they are set in relative rotation. This creates friction, which heats the materials of the base body 2 and the expansion sleeve workpiece 26 in the region of the stop faces 28. To join the expansion sleeve workpiece 26 and the base body 2, the relative rotation is braked and the base body 2 and the expansion sleeve workpiece 26 are pressed against each other, upsetting them to form a welding bead 15. In the process, the expansion sleeve workpiece 26 is pressed even further into the base body 2.

After the expansion sleeve workpiece 26 has been fixed to the base body 2 via the two friction weld joints 14, a section 29 of the expansion sleeve workpiece 26 projecting from the front end face of the base body 2 can be cut off so that only an expansion sleeve 5 remains. Subsequently, a receptacle 6 with a circular cylindrical cross-section can be produced in the expansion sleeve workpiece 26, for example by means of drilling.

Although the invention has been further illustrated and described in detail by preferred embodiments, the invention is not limited by the disclosed examples and other variations may be derived therefrom by those skilled in the art without departing from the scope of protection of the invention.

Figure 10:
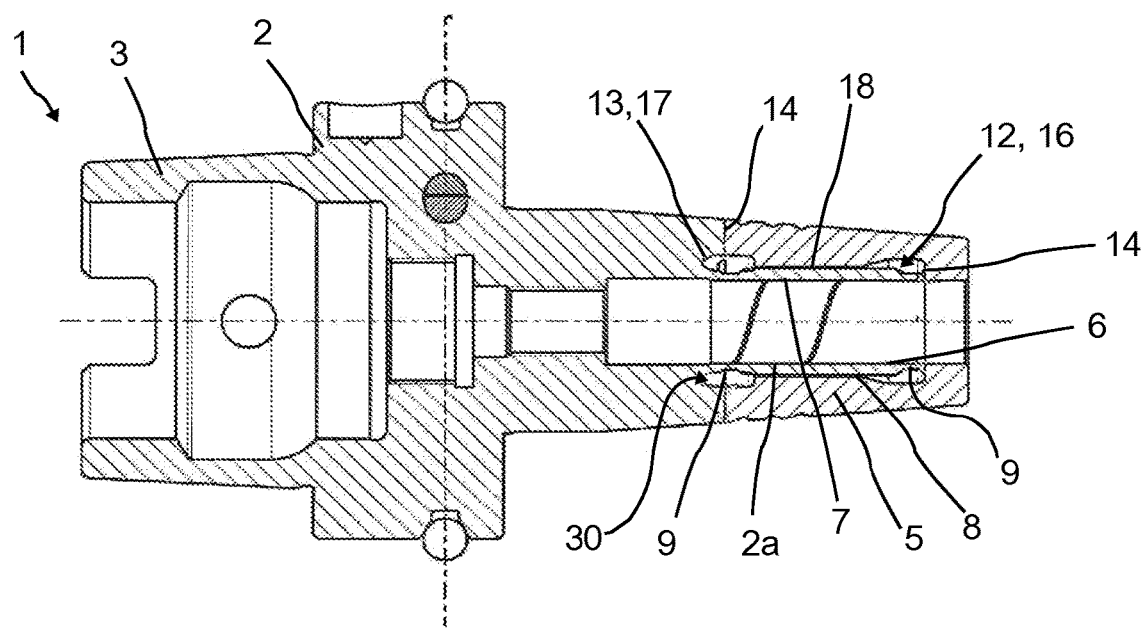
Figure 11:
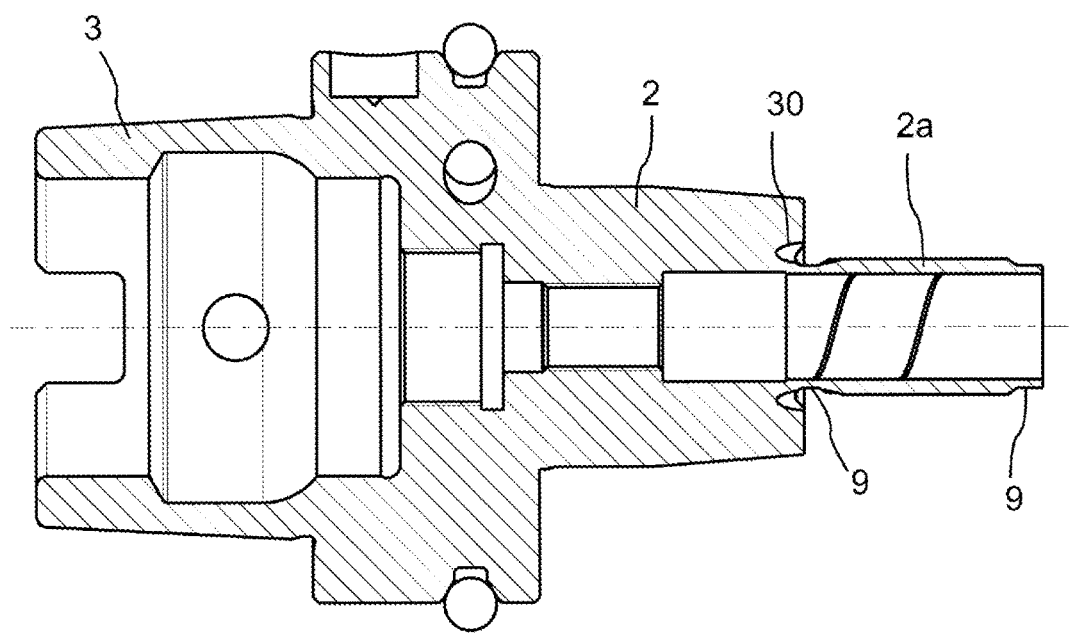
FIG. 11 a longitudinal sectional view of the base body of the expansion clamping device of FIG. 10.
Figure 12:
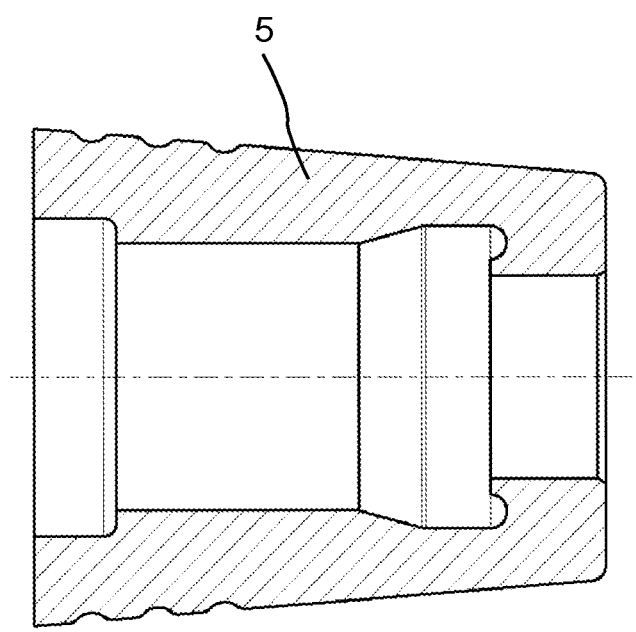
FIG. 12 a longitudinal section of a sleeve of the expansion clamping device shown in FIG. 10.

FIGS. 10 to 12 show a further expansion chuck in accordance with the present invention. Like the expansion chuck 1 of the first embodiment, the expansion chuck is designed as a hollow shaft taper tool holder HSK and comprises a base body 2, which has a fastening cone 3 at its left-hand end region for clamping to a machine tool. A central receptacle 6 is provided at the opposite front end region of the base body 2, into which a cylindrical shaft of a tool such as a drill or milling cutter can be inserted. The axially front end of the basic body 2 is designed as an expansion sleeve 2a which can be elastically deformed. A sleeve 5 is pushed axially onto the expansion sleeve 2a, whereby a pressure chamber 8 is formed between the sleeve 5 and the expansion sleeve 2a, which surrounds the receptacle 6 and is aligned coaxially thereto. The pressure chamber 8, the axial length of which corresponds approximately to the length of the clamping surface 7, is formed by ring-like recesses 9 in the outer lateral surface of the expansion sleeve 2a and in the inner surface of the sleeve 5.

Towards the receptacle 6, the pressure chamber 8 is bounded by a relatively narrow/thin wall of the expansion sleeve 2a and radially outwards by the wall of the sleeve 5, the wall thickness of which is several times greater than the wall thickness of the expansion sleeve 2a. As in the first embodiment, the pressure chamber 8 can be pressurized with a hydraulic medium in order to elastically deform the expansion sleeve 2a inwardly and thus tension a component inserted into the receptacle 6.

In this embodiment, the base body 2 and the sleeve shaft 5 are joined by friction welding 14 in their front and rear axial end sections. The rear end face rests against a front end face of the sleeve 5 of the base body 2, from which the expansion sleeve 2a also projects, and an inwardly projecting collar of the sleeve 5 rests against the front end face of the expansion sleeve 2a. In the area of the axial contact surfaces, the components are fixed to each other by friction weld joints 14. In order to accommodate the welding bead 15 produced during the creation of the respective friction weld joint 14, the pressure chamber 8 is widened in its front axial end region 16 and in its rear axial end region 17 in the radial direction relative to a region 18 of the pressure chamber 8 that is central in the axial direction. In addition, an annular groove 30 is formed in the front end face of the base body 2 around the expansion sleeve 2a projecting therefrom.

LIST OF REFERENCE SIGNS 1 expansion clamping device
2 base body
2a expansion sleeve
3 fixing cone
4 axial bore
5 sleeve
6 receptacle
7 clamping surface
8 pressure chamber
9 ring-like recesses
10 inner wall of the expansion sleeve
11 hydraulic fluid supply channel
12 front axial end section
13 rear axial end section
14 friction weld joint
15 welding bead
16 front axial end region
17 rear axial end region
18 central region in axial direction
19 mandrel
20 end area shown on the left
21 end area shown on the right
22 basic body shaft
23 hydraulic fluid channel
24 rear threaded hole
25 front threaded hole
26 expansion sleeve workpiece
27 expansion sleeve shaft
28 stop face
29 section
30 ring groove

The invention claimed is:

1. An expansion clamping device, comprising:
a base body (2) defining a longitudinal axis; and
a sleeve (5) inserted into or surrounding the base body (2) and forming at least one pressure chamber (8), wherein the at least one pressure chamber (8) can be pressurized by a hydraulic medium in order to achieve a clamping effect, wherein the sleeve (5) is fixed to the base body (2) by a friction weld joint (14) at a front axial end region (16) of the at least one pressure chamber (8) and/or at a rear axial end region (17) of the at least one pressure chamber (8), and wherein the at least one pressure chamber (8) receives in the front and/or rear axial end region (16, 17) adjacent to the friction weld joint (14) a welding bead (15) produced during the creation of the friction weld joint (14) and is widened relative to a region (18) of the at least one pressure chamber (8) which is central in an axial direction.

2. The expansion clamping device according to claim 1, wherein the sleeve (5) is inserted into the base body (2) or surrounds it, forming a single pressure chamber (8) extending annularly around the longitudinal axis, and the sleeve (5) is fixed at its front and/or rear end section (12, 13) to the base body (2) by means of the friction weld joint (14).

3. The expansion clamping device according to claim 1, wherein the sleeve (5) is inserted into or surrounds the base body (2) to form two axially successive pressure chambers (8), wherein the sleeve (5) is fixed axially between the pressure chambers (8) to the base body (2) by the friction weld joint (14) and/or wherein the sleeve (5) is fixed to the base body (2) at the rear axial end region (17) of the rear pressure chamber (8) and/or at the front axial end region (16) of the front pressure chamber (8) by the friction weld joint (14).

4. The expansion clamping device according to claim 1, wherein the friction weld joint (14) is produced by sliding friction welding and/or that the friction weld joint (14) is produced by a rotation welding process, and/or
wherein the sleeve (5) is heat-treated, and/or
wherein the sleeve (5) comprises a non-alloy steel and/or a low-alloy steel and/or a high-alloy steel and/or a ceramic material and/or a case-hardened steel.

5. The expansion clamping device according to claim 1, wherein the sleeve (5) is an expansion sleeve which is elastically deformed when the pressure chamber (8) is pressurized in order to achieve a clamping effect, and wherein the sleeve (5) is inserted into the base body (2) and the inner surface of the sleeve (5) forms a clamping surface (7), or the sleeve (5) surrounds the base body (2) and the outer surface of the sleeve (5) forms a clamping surface (7).

6. The expansion clamping device according to claim 5, wherein the clamping surface (7) is provided with a surface coating.

7. The expansion clamping device according to claim 1, wherein an axially front end of the base body (2) is designed as an expansion sleeve (2a) and the sleeve (5) is pushed axially onto the expansion sleeve (2a), wherein at least one pressure chamber (8) is formed between the sleeve (5) and the expansion sleeve (2a), wherein the inner surface of the expansion sleeve (2a) forms a clamping surface (7), and wherein the expansion sleeve (2a) is elastically deformed when the pressure chamber (8) is pressurized by a hydraulic medium to achieve a clamping effect.

8. The expansion clamping device according to claim 1, wherein the expansion clamping device has tensioning means which selectively cause an increase in pressure in the hydraulic medium, and wherein the tensioning means is operatively connected to the pressure chamber (8) via a hydraulic medium supply channel (23).

* * * * *